US012585822B1

(12) United States Patent
Pisapati et al.

(10) Patent No.: US 12,585,822 B1
(45) Date of Patent: Mar. 24, 2026

---

(54) REFRESH RATE MODULATION

(71) Applicant: Bank of America Corporation, Charlotte, NC (US)

(72) Inventors: Ravikumar Pisapati, Chennai (IN); Amit Singh Kohli, Navi Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/194,277

(22) Filed: Apr. 30, 2025

(51) Int. Cl.
| | |
|---|---|
| *G06F 21/62* | (2013.01) |
| *G06F 7/58* | (2006.01) |
| *G06V 20/40* | (2022.01) |
| *G09G 3/20* | (2006.01) |
| *G09G 5/12* | (2006.01) |

(52) U.S. Cl.
CPC .......... *G06F 21/6254* (2013.01); *G06F 7/582* (2013.01); *G06V 20/46* (2022.01); *G06V 20/49* (2022.01); *G09G 3/20* (2013.01); *G09G 5/12* (2013.01); *G06V 2201/02* (2022.01); *G09G 2340/0435* (2013.01); *G09G 2358/00* (2013.01)

(58) Field of Classification Search
CPC ...... G06F 21/84; G06F 21/6254; G06F 7/582; G06V 20/46; G06V 20/49; G09G 5/12; G09G 2340/0435; G09G 2358/00
See application file for complete search history.

(56) References Cited

U.S. PATENT DOCUMENTS

| | | | | |
|---|---|---|---|---|
| 10,992,900 | B1* | 4/2021 | Mattioli | G06F 21/84 |
| 2006/0029252 | A1* | 2/2006 | So | H04N 21/23892 380/201 |
| 2009/0252323 | A1* | 10/2009 | Cooper | G06F 21/6218 380/54 |

(Continued)

FOREIGN PATENT DOCUMENTS

| | | |
|---|---|---|
| CN | 104282286 | 1/2015 |
| WO | WO2013/029493 | 3/2013 |

OTHER PUBLICATIONS

Chanakya Mehta, "Understanding high dynamic range (HDR) displays—enhancing the viewing experience," Texas Instruments Incorporated, 2018.

(Continued)

*Primary Examiner* — Sepehr Azari
(74) *Attorney, Agent, or Firm* — Weiss & Arons LLP

(57) ABSTRACT

Apparatus, methods and systems for transmitting secure data from a first computing device to a second computing device absent an intermediatory protocol. The method may include displaying entity-related data on the first computing device. At randomly selected time intervals, the methods may include refreshing the first computing device based on a pseudorandom refresh rate pattern. The methods may include using the second computing device to record the first display screen. The recording may use a live stream. The method may include using a decoder engine to identify the pseudorandom refresh rate pattern. The methods may (Continued)

include synchronizing a refresh rate of the second comput-ing device with the identified pseudorandom refresh rate pattern. The methods may include segmenting the live stream into a plurality of still photographs. The methods may include combining the still photographs using an AI engine to recreate a decipherable version of the entity-related data.

19 Claims, 9 Drawing Sheets

(56) References Cited

U.S. PATENT DOCUMENTS

| | | | |
|---|---|---|---|
| 2021/0034793 A1* | 2/2021 | Wang | G06F 21/6245 |
| 2022/0223121 A1* | 7/2022 | Boyack | G06F 21/84 |
| 2023/0186421 A1* | 6/2023 | Wallace | G06T 1/0085 |
| | | | 382/100 |
| 2023/0409721 A1* | 12/2023 | Ghosh | G06F 21/82 |
| 2024/0203312 A1* | 6/2024 | Nuckols | G06F 21/6218 |

OTHER PUBLICATIONS

"How to Enable Dynamic Refresh Rate Switching," Intel, Aug. 29, 2022.

* cited by examiner

REFRESH RATE MODULATION

FIELD OF TECHNOLOGY

Aspects of the disclosure relate to data security.

BACKGROUND OF THE DISCLOSURE

Over the past few years, there has been a widespread adoption of remote employment. Remote employment is generally facilitated using laptops and other mobile devices at locations remote from a secure entity-location. Using laptops and other mobile devices outside a secure entity-location has introduced new challenges and risks to data security and confidentiality. As employees increasingly operate devices at home or other remote locations, sensitive data, including production data or non-public information, may be capturable by a user that does not have access permissions to the sensitive data.

Traditional security protocols often focus on network-level protection, encryption, and access controls. However, traditional security protocols do not adequately address the threat posed by unauthorized capture though physical or visual means. Remote employees, whether inadvertently or maliciously, may enable sensitive data to be captured by unauthorized devices. The inadvertent or malicious exposure of sensitive data can lead to security breaches, legal repercussions, financial losses and/or reputational damage.

Therefore, it would be desirable to provide a system to prevent unauthorized photo/video capture of sensitive information that is displayed on a computing device. Such a system may preferably operate a pseudorandomized refresh rate pattern.

SUMMARY OF THE DISCLOSURE

Systems, apparatus and methods for transmitting secure data from one computing device to another computing device absent an intermediatory protocol are provided.

Systems, apparatus and methods may be used for transferring data between two legitimate parties. The two legitimate parties may both be associated with one entity. Systems, apparatus and methods may be used to detect and remove activities of malicious/bad actors.

The methods may include displaying entity-related data on a first display screen. The first display screen may be linked to a first computing device. The first display screen may be a graphical user interface ("GUI"). The first display screen may include an liquid crystal display ("LCD") screen, a light emitting diode ("LED") screen, an organic light emitting diode ("OLED") screen and/or any other suitable digital display screen. The first computing device may include a desktop computer, a mobile computer, a laptop, a tablet, a smartphone and/or any other suitable computing device.

The first computing device may be associated with an entity. The entity-related data may relate to the entity. The entity-related data may include sensitive data. Sensitive data may include customer specific data, such as credit card information, identification information and/or any other suitable sensitive customer specific information. Sensitive data may include entity specific data, such as entity-related financial information, entity-related identification information and/or any other suitable entity-related sensitive information. Sensitive information may include any information that is not available for the public.

The first computing device may be a remote computing device. The remote computing device may be located in a location remote from a secure-entity location. The remote computing device may be located in an unsecure location. The secure-entity location may include any location designated by the entity in which entity-only personal are present, for example, an office space. Any other location in which the remote computing device is located may be considered an unsecure location.

The first display screen may have a refresh rate. The refresh rate may be a number of times per second that the display screen updates an image that it is displaying. The first computing device may generate a pseudorandom refresh rate pattern.

The first computing device may include an encoder engine. The encoder engine may operate on a processer. The processor may be included in the first computing device. The encoder engine may include a randomized generator. The randomized generator may operate using a linear congruential generator ("LCG") algorithm. The randomized generator may operate using any other suitable algorithm. The randomized generator may generate the pseudorandom refresh rate pattern.

The pseudorandom refresh rate pattern may include a plurality of refresh rates. The pseudorandom refresh rate pattern may include a plurality of different refresh rate frequencies. The different refresh rate frequencies may be included in a range between 60 Hz and 240 Hz. The range may include any suitable frequencies below 60 Hz. The range may include any suitable frequencies above 240 Hz.

The first computing device may refresh the first display screen. The first computing device may refresh the first display screen at randomly selected time intervals. The first computing device may refresh the first display screen based on the pseudorandom refresh rate pattern.

For example, the pseudorandom refresh rate pattern for a given time period may be 62 Hz, 220 Hz, 115 Hz, 118 Hz, followed by 144 Hz. The randomly selected time intervals may include 0.3 milliseconds, 1.2 seconds, 0.5 seconds, followed by 0.07 milliseconds. The first computing device may refresh the first display screen to be a 62 Hz display. After 0.3 milliseconds, the first computing device may refresh the first display screen to be a 220 Hz display. After 1.2 seconds the first computing device may refresh the first display screen to be a 115 Hz display. After 0.5 seconds, the first computing device may refresh the first display screen to be a 118 Hz display. After 0.07 milliseconds, the first computing device may refresh the first display screen to be a 144 Hz display. The first computing device may continually refresh the first display screen according to the pseudorandom refresh rate pattern at the randomly selected time intervals.

The refreshing of the first display screen may not be detectable by a user of the first computing device. The refreshing of the first display screen may not be detectable by any user.

In the event that both the first computing device and the second computing device are associated with the entity, methods may include capturing the entity-related data using a second computing device. The second computing device may be a mobile device. The second computing device may be any suitable mobile device that is able to take a photograph or a video of another computing device. The mobile device may include computing devices such as a smartphone, a tablet, a laptop and/or any other suitable computing devices.

The second computing device may be associated with the entity. The second computing device may be linked to a second display screen. The second display screen may be a graphical user interface ("GUI"). The second display screen may include an liquid crystal display ("LCD") screen, a light emitting diode ("LED") screen, an organic light emitting diode ("OLED") screen and/or any other suitable digital display screen.

The methods may include using the second computing device to record the first display screen. The second computing device may record the first display screen using a live stream. The live stream may include video and/or any suitable capturing medium with or without an internet connection. The live stream may be executed via a live stream software application. The live stream software application may operate a camera included in the second computing device.

The live stream may capture the entity-related data from the first display screen. The entity-related data may be indecipherable by the live stream application. The entity-related data may be indecipherable by a user of the second computing device. The entity-related data may be indecipherable by the live stream application or the user of the second computing device because of the pseudorandom refresh rate pattern. The live stream may be captured by capturing a plurality of still images and then displaying the plurality of still images in succession, to appear like motion. Therefore, when the live stream application captures still images of the first display screen, the still images may be distorted because of the changing refresh rates. In real time, the pseudorandom refresh rate pattern may be undetectable, as soon as still images are captured, the changing refresh rates may cause the still images to appear distorted.

The methods may include storing the captured live stream in a memory location associated with the second computing device. The memory location may be included in the second computing device. The memory location may be remote from the second computing device. The memory location may be in electronic communication with the second computing device. The memory location may be a random-access memory ("RAM"), read-only memory ("ROM"), cache memory, cloud computing memory and/or any other suitable memory location.

The methods may include using a decoder engine to identify the pseudorandom refresh rate embedded within the live stream. The decoder engine may be operating on a processor. The decoder engine may analyze the captured live stream. The decoder engine may use an artificial intelligence ("AI") engine to identify the pseudorandom refresh rate pattern from the captured live stream.

The AI engine may be operating with a large language model ("LLM"). The AI engine may include progressive learning algorithms. The progressive learning algorithms may ingest training data. The progressive learning algorithms may analyze the ingested training data. The progressive learning algorithms may analyze the training data for correlations and patterns within the data. The progressive learning algorithms may use the analyzed correlations and patterns to generate outputs. The AI engine may update the progressive learning algorithms based on the generated outputs curated/retrieved from the analyzed correlations and patterns.

The AI engine may include machine learning algorithms. Machine learning algorithms may enable the AI engine to learn from experience without specific instructional programming. The AI engine may include deep learning algorithms. Deep learning algorithms may utilize neural networks. Neural networks may use interconnected nodes or neurons in a layered structure to analyze data and generate outputs.

The AI engine may reverse engineer the live stream in order to identify the pseudorandom refresh rate pattern. The AI module may identify at what time interval the refresh rate was changed based on the distortion of the still images. The AI engine may identify the pseudorandom refresh rate pattern as well as the randomly selected time intervals at which the refresh rate frequency was changed.

The methods may include decoding the entity-related data stored in the live stream. The decoding may be based on the identified pseudorandom refresh rate pattern. The decoding may include synchronizing, while replaying the live stream, a refresh rate of the second display screen with the identified pseudorandom refresh rate pattern. While replaying the live stream on the synchronized second display screen, the decoder engine may resegment the live stream into a second plurality of still images. Each still image included in the second plurality of still images may be segmented based on a refresh rate identified from the pseudorandom refresh rate pattern. Each still image may include decipherable data.

The AI engine may combine the second plurality of still images. The AI engine may combine the second plurality of still images to recreate a decipherable version of the entity-related data. The second computing device may display the decipherable version of the entity-related data on the second display screen.

After displaying the decipherable version of the entity-related data on the second computing device, the second computing device may generate a second pseudorandom refresh rate pattern. At randomly selected time intervals, the second computing device may refresh the second display screen. The refreshing may not be detectable by the user of the second computing device. The refreshing may not be detectable by any user. The refreshing may be based on the second pseudorandom refresh rate pattern.

The second computing device may generate an incident report. The second computing device may generate an incident report in response to successfully recreating the decipherable version of the entity-related data. The incident report may include metadata associated with a date, a time and a location at which the entity-related data was captured by the second computing device. The incident report may include the pseudorandom refresh rate pattern. The incident report may include a copy of the entity-related data. The incident report may include any other suitable data or metadata. The incident report may be stored in a decentralized blockchain. The decentralized blockchain may be operated by the entity. The incident report may be used for data verification.

The methods may include detecting on the first computing device that the second computing device is recording the first display screen. The first computing device may include one or more sensors. The one or more sensors may detect if a mobile/computing device is attempting to capture the entity-related data displayed on the first display screen.

In response to detecting that the second computing device is attempting to capture the entity-related data, the first computing device may verify that the second computing device is associated with the entity. The first computing device may transmit an identification notification to the second computing device. In response to receiving the identification notification, the second computing device may transmit an identification confirmation back to the first computing device. The identification confirmation may include an identification code. The identification code may indicate that the second computing device is associated with the entity. The identification code may include any suitable alphanumeric sequence, graphical confirmation, biometric identification and/or any other suitable identification code.

In response to failing to verify that the second computing device is associated with the entity, the first computing device may prevent the second computing device from recording the first display screen. In the event that the second computing device is not associated with the entity, the methods may include blocking activities of the second computing device.

The one or more sensors included in the first computing device may include electronic sensors and/or physical sensors. The one or more sensors may include a camera. The one or more sensors may include motion detectors, radar detectors, proximity sensors and/or any other suitable sensors.

The first computing device may detect that the entity-related data is being displayed on the first display screen. In response to detecting that the entity-related data is displayed on the first display screen, the first computing device may modulate the refresh rate of the first display screen. The modulating may include refreshing the first display screen by toggling, at predetermined randomized intervals, between the plurality of refresh rates. In response to detecting that the entity-related data is being displayed on the first display screen, the first computing device may activate the one or more sensors.

The methods may include detecting, using the one or more sensors, the second computing device attempting to capture the entity-related data. The second computing device may not be operated by the entity. The second computing device, not operated by the entity, may be a mobile device.

The second computing device may attempt to capture the entity-related data via a live stream. The second computing device may attempt to capture the entity-related data using a camera application. The camera application may be a software application operating on the second computing device. The camera application may execute the live stream. The camera application may execute the live stream via a camera included in the second computing device. The second computing device may store the live stream in at least one memory location associated and/or in electronic communication with the second computing device.

In response to detecting the second computing device and determining that the second computing device is not being operated by the entity, the first computing device may embed a software code into pixels displayed on the first display screen. The software code may not be visible to a user looking at the first display screen. The software code may be capturable by the second computing device. The software code may manipulate the second computing device to capture the software code without the second computing device detecting a purpose of the software code.

Upon being captured at the second computing device, the software code may manipulate a processor of the second computing device to silently execute the software code. The software code may be executed without being detected by a user of the second computing device. The software code may monitor the second computing device. The software code may monitor the camera application.

The software code may safeguard the entity-related data captured by the second computing device. The safeguarding may include continuously monitoring the camera application. The safeguarding may include locating the pseudorandom refresh rate pattern.

Failure to locate the pseudorandom refresh rate pattern at the second computing device may indicate that the second computing device was not able to identify the pseudorandom refresh rate pattern. In response to failing to locate the pseudorandom refresh rate pattern at the second computing device, the software code may self-delete from the second computing device.

Locating the pseudorandom refresh rate pattern at the second computing device may indicate that the second computing device was able to identify the pseudorandom refresh rate pattern. In response to locating the pseudorandom refresh rate pattern at the second computing device, the software code may delete the live stream from all memory locations associated with the second computing device and all memory locations that are in electronic communication with the second computing device.

After deleting the live stream from all memory locations, the software code may transmit a data leakage warning from the second computing device to the first computing device. The data leakage warning may notify the user of the first computing device that data was captured by the second computing device and that the pseudorandom refresh rate pattern was identified. The data leakage warning may be stored as part of the incident report. After transmitting the data leakage warning, the software code may block the camera application.

Blocking the camera application may include preventing the camera application from capturing videos, pictures and/or live streams. Blocking the camera application may include blocking a communication link between the camera application and all memory locations. The camera application may be able to capture pictures, videos and/or live streams, however, the camera application may be unable to store the pictures, videos and/or live streams.

After blocking the camera application, the software code may self-delete from the second computing device. In response to a failure to block the camera application, the software code may continuously execute until the one or more sensors no longer detects the second computing device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Figure 1:
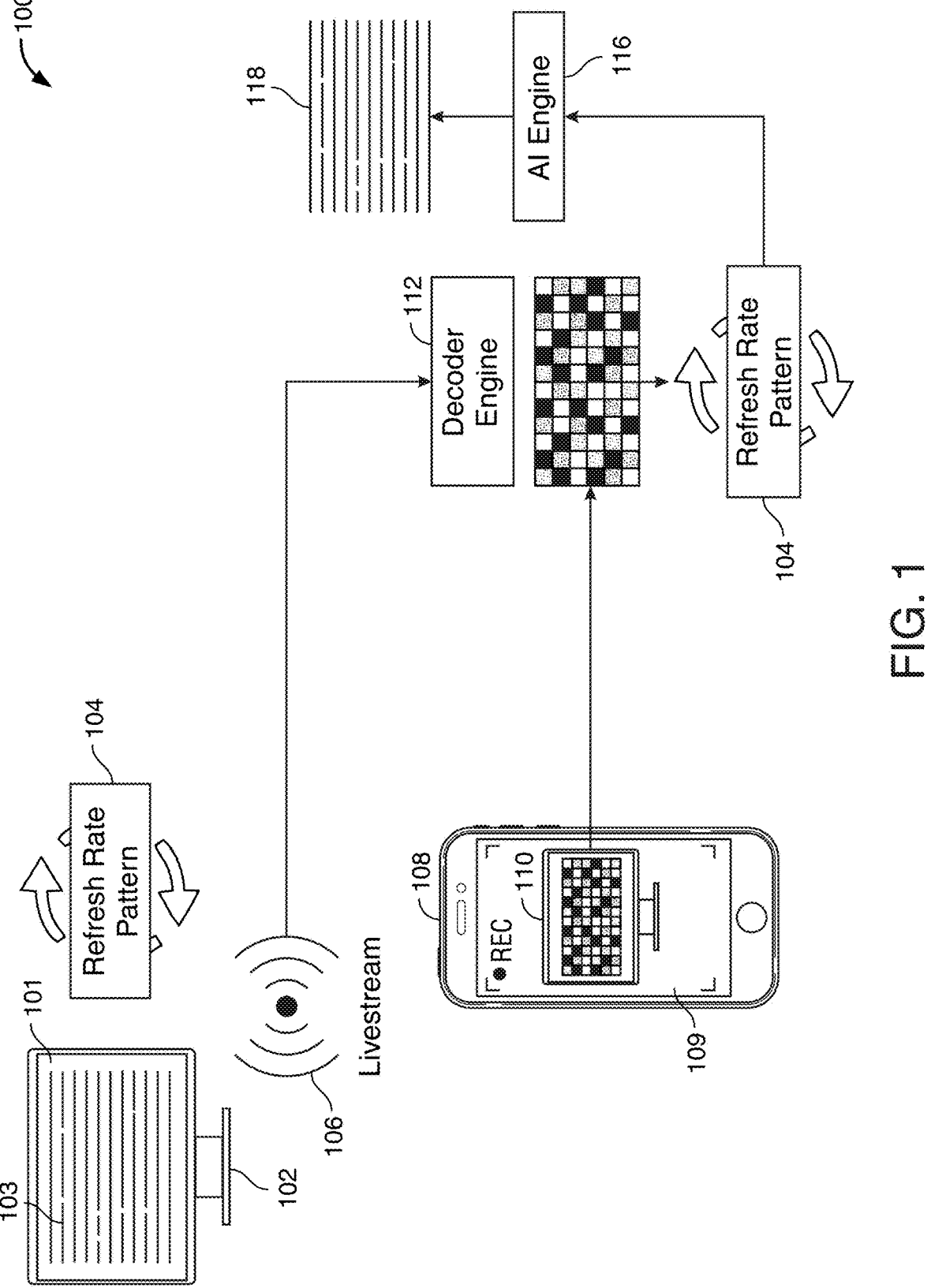
FIG. 1 shows an illustrative diagram in accordance with principles of the disclosure.

Systems, apparatus and methods for transmitting secure data from one computing device to another computing device absent an intermediatory protocol is provided.

The apparatus may include a first computing device. The first computing device may have a first display screen. The first display screen may be a graphical user interface ("GUI"). The first display screen may include an liquid crystal display ("LCD") screen, a light emitting diode ("LED") screen, an organic light emitting diode ("OLED") screen and/or any other suitable digital display screen. The first computing device may include a desktop computer, a mobile computer, a laptop, a tablet, a smartphone and/or any other suitable computing device.

The first computing device may be associated with an entity. The first computing device may display entity-related data. The entity-related data may relate to the entity.

The apparatus may include a randomized generator. The randomized generator may be included in the first computing device. The randomized generator may be in electronic communication with the first computing device. The randomized generator may generate a pseudorandom refresh rate pattern. The pseudorandom refresh rate pattern may include a plurality of different refresh rate frequencies. The different refresh rate frequencies may be included in a range between 60 Hz and 240 Hz. The range may include any suitable frequencies below 60 Hz. The range may include any suitable frequencies above 240 Hz.

The apparatus may include a refresh rate modulator. The refresh rate modulator may be included in the first computing device. The refresh rate modulator may be included in the first display screen. The refresh rate modulator may be in electronic communication with the first computing device. The refresh rate modulator may be in electronic communication with the first display screen. The refresh rate modulator may refresh, at randomly selected time intervals, the first display screen based on the pseudorandom refresh rate pattern. The refresh rate modulator may refresh the display screen without being detected by a user of the first computing device.

For example, at first time interval, the refresh rate of the first display screen may have a first refresh rate. At a second time interval, the refresh rate modulator may change the refresh rate to a second refresh rate. The second refresh rate may be a higher refresh rate than the first refresh rate. The second refresh rate may be a lower refresh rate than the second refresh rate. A higher refresh rate may indicate that the first display screen is updating its display more times per second than it would if it had a lower refresh rate.

The apparatus may include a second computing device. The second computing device may have a second display screen. The second computing device may be a mobile device. The second computing device may be any suitable mobile device that is able to take a photograph or a video of another computing device. The mobile device may include computing devices such as a smartphone, a tablet, a laptop and/or any other suitable computing device. The second display screen may be a graphical user interface ("GUI"). The second display screen may include an liquid crystal display ("LCD") screen, a light emitting diode ("LED") screen, an organic light emitting diode ("OLED") screen and/or any other suitable digital display screen.

The second computing device may be associated with the entity.

The second computing device may capture the entity-related data from the first display screen. The second computing device may include a live stream application. The live stream application may be executed by a processor included in the second computing device. The live stream application may be operated using a camera included in the second computing device. The second computing device may capture the entity-related data via a live stream.

The captured entity-related data may be indecipherable by the live stream application. The entity-related data may be indecipherable by the live stream application because of the pseudorandom refresh rate pattern. The live stream may be captured by capturing a plurality of still images and displaying the plurality of still images in succession to appear like motion. Therefore, when the live stream application captures still images of the first display screen, the still images may be distorted because of the changing refresh rates. In real time, the pseudorandom refresh rate pattern may be undetectable, as soon as still images are captured, the changing refresh rates may cause the still images to appear distorted.

The live stream may be stored in a memory location. The memory location may be associated with the second computing device. The memory location may be included in the second computing device. The memory location may be remote from the second computing device. The memory location may be in electronic communication with the second computing device. The memory location may be a random-access memory ("RAM"), read-only memory ("ROM"), cache memory, cloud computing memory and/or any other suitable memory location.

The second computing device may include a decoder engine. The decoder engine may operate on the processor included in the second computing device. The decoder engine may identify the pseudorandom refresh rate pattern embedded in the live stream.

The decoder engine may analyze the captured live stream. The decoder engine may use an artificial intelligence ("AI") engine to identify the pseudorandom refresh rate pattern from the captured live stream.

The AI engine may be operating with a large language model ("LLM"). The AI engine may include progressive learning algorithms. The progressive learning algorithms may ingest training data. The progressive learning algorithms may analyze the ingested training data. The progressive learning algorithms may analyze the training data for correlations and patterns within the data. The progressive learning algorithms may use the analyzed correlations and patterns to generate outputs. The AI engine may update the progressive learning algorithms based on the generated outputs curated/retrieved from the analyzed correlations and patterns.

The AI engine may include machine learning algorithms. Machine learning algorithms may enable the AI engine to learn from experience without specific instructional programming. The AI engine may include deep learning algorithms. Deep learning algorithms may utilize neural networks. Neural networks may use interconnected nodes or neurons in a layered structure to analyze data and generate outputs.

The AI engine may reverse engineer the live stream in order to identify the pseudorandom refresh rate pattern. The AI module may identify at what time interval the refresh rate was changed based on the distortion of the still images. The AI engine may identify the pseudorandom refresh rate pattern as well as the randomly selected time intervals at which the refresh rate frequency was changed.

The decoder engine may synchronize, while replaying the live stream, a refresh rate of the second display screen with the identified pseudorandom refresh rate pattern. Synchronizing the refresh rate of the second display screen with the identified pseudorandom refresh rate pattern may include modulating the refresh rate of the second display screen using the refresh rate pattern. While replaying the live stream on the synchronized second display screen, the decoder engine may resegment the live stream into a second plurality of still images. Each still image included in the second plurality of still images may be segmented based on a refresh rate identified from the pseudorandom refresh rate pattern. Each still image may include decipherable data.

The AI engine may combine the second plurality of still images. The AI engine may combine the second plurality of still images to recreate a decipherable version of the entity-related data. The second computing device may display the decipherable version of the entity-related data on the second display screen.

After displaying the decipherable version of the entity-related data on the second computing device, the second computing device may generate a second pseudorandom refresh rate pattern. At randomly selected time intervals, the second computing device may refresh the second display screen. The refreshing may not be detectable by a user of the second computing device. The refreshing may not be detectable by any user. The refreshing may be based on the second pseudorandom refresh rate pattern.

The second computing device may generate an incident report. The second computing device may generate an incident report in response to successfully recreating the decipherable version of the entity-related data. The incident report may include metadata associated with a date, a time and a location at which the entity-related data was captured by the second computing device. The incident report may include the pseudorandom refresh rate pattern. The incident report may include a copy of the entity-related data. The incident report may include any other suitable data or metadata. The incident report may be stored in a decentralized blockchain. The decentralized blockchain may be operated by the entity. The incident report may be used for data verification.

The first computing device may detect that the second computing device is recording the first display screen. The first computing device may include one or more sensors. The one or more sensors may include a camera. The camera may detect if a mobile/computing device is attempting to capture the entity-related data displayed on the first display screen.

In response to detecting that the second computing device is attempting to capture the entity-related data, the first computing device may verify that the second computing device is associated with the entity. The first computing device may transmit an identification notification to the second computing device. In response to receiving the identification notification, the second computing device may transmit an identification confirmation back to the first computing device. The identification confirmation may include an identification code. The identification code may indicate that the second computing device is associated with the entity. The identification code may include any suitable alphanumeric sequence, graphical confirmation, biometric identification and/or any other suitable identification code.

In response to failing to verify that the second computing device is associated with the entity, the first computing device may prevent the second computing device from recording the first display screen.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative data transfer 100. Data transfer 100 may include computing device 102. Computing device 102 may be associated with an entity. Computing device 102 may include display screen 101. Display screen 101 may display entity-related data 103. Entity-related data 103 may be related to the entity. Entity-related data 103 may include sensitive data.

In order to prevent unauthorized users from capturing entity-related data 103, computing device 102 may continually refresh display screen 101. Computing device 102 may continually refresh display screen 101 using refresh rate pattern 104. Refresh rate pattern 104 may be a pseudorandom refresh rate pattern. Refresh rate pattern 104 may be stored in memory location associated with, or within, computing device 102.

Refresh rate pattern 104 may include a plurality of different refresh rate frequencies, such as, for example, 60 Hz, 120 Hz, 240 Hz, etc. Computing device 102 may refresh display screen 101 by toggling between the different refresh rate frequencies. Computing device 102 may toggle between the different refresh rate frequencies at randomly selected time intervals. A time interval may include milliseconds, seconds, minutes, any combination of milliseconds, seconds and minutes and/or any other suitable time interval. The toggling between the different refresh rate frequencies may be undetectable by a user of computing device 102. Refresh rate pattern 104 may be imperceptible to the user but may be detectable by a camera/video application.

Computing device 108 may attempt to capture entity-related data 103 from display screen 101. Computing device 108 may attempt to capture entity-related data 103 via live stream 106. Live stream 106 may be executed by a live stream software application executing on computing device 108. Computing device 108 may be a mobile device. Computing device 108 may include any suitable computing device that includes a camera capable of capturing images and/or videos. Computing device 108 may be associated with the entity.

Computing device 108 may include an identification number, identifying computing device 108 as being associated with the entity. Prior to capturing live stream 106 of display screen 101, computing device 108 may transmit the identification number to computing device 102. The identification number may be transmitted via a signal, multimedia messaging service ("MMS"), email, short message service ("SMS"), Bluetooth, Wi-Fi and/or any other suitable data transfer medium. Transmitting the identification number may notify computing device 102 that computing device 108 is associated with the entity.

Live stream 106 may capture entity-related data 103. Computing device 108 may include display screen 109. Captured entity-related data 110 may not be decipherable by computing device 108 or a user of computing device 108, when displayed on display screen 109. Captured entity-related data 110 may not be decipherable because of changing refresh rate pattern 104. Refresh rate pattern 104 may cause entity-related data to appear distorted to the user of computing device 108 when captured via live stream 106.

Computing device 108 may store live stream 106 in a memory location associated with computing device 108. Computing device 108 may operate decoder engine 112. Decoder engine 112 may operate on a processor included in computing device 108. Decoder engine 112 may decipher refresh rate pattern 104 based on analyzing live stream 106. Decoder engine 112 may identify the randomly selected time intervals at which display screen 101 was refreshed. After identifying the randomly selected time intervals, decoder engine 112 may identify a frequency refresh rate at which display screen 101 was being refreshed for each time interval.

Computing device 108 may synchronize display screen 109 with refresh rate pattern 104 while replaying live stream 106. Synchronizing display screen 109 with refresh rate pattern 104 may enable live stream 106 to be readable.

Computing device 108 may operate artificial intelligence ("AI") engine 116. AI engine 116 may be executed using a large language model ("LLM"). AI engine 116 may segment live stream 106 into a plurality of still images. AI engine 116 may segment live stream 106 into a plurality of still images based on each change of refresh rates. AI engine 116 may combine the still images to create entity-related data 118. Entity-related data 118 may be a decipherable version of entity-related data 103. Computing device 108 may store entity-related data 118 in the memory location associated with computing device 108.

Figure 2:
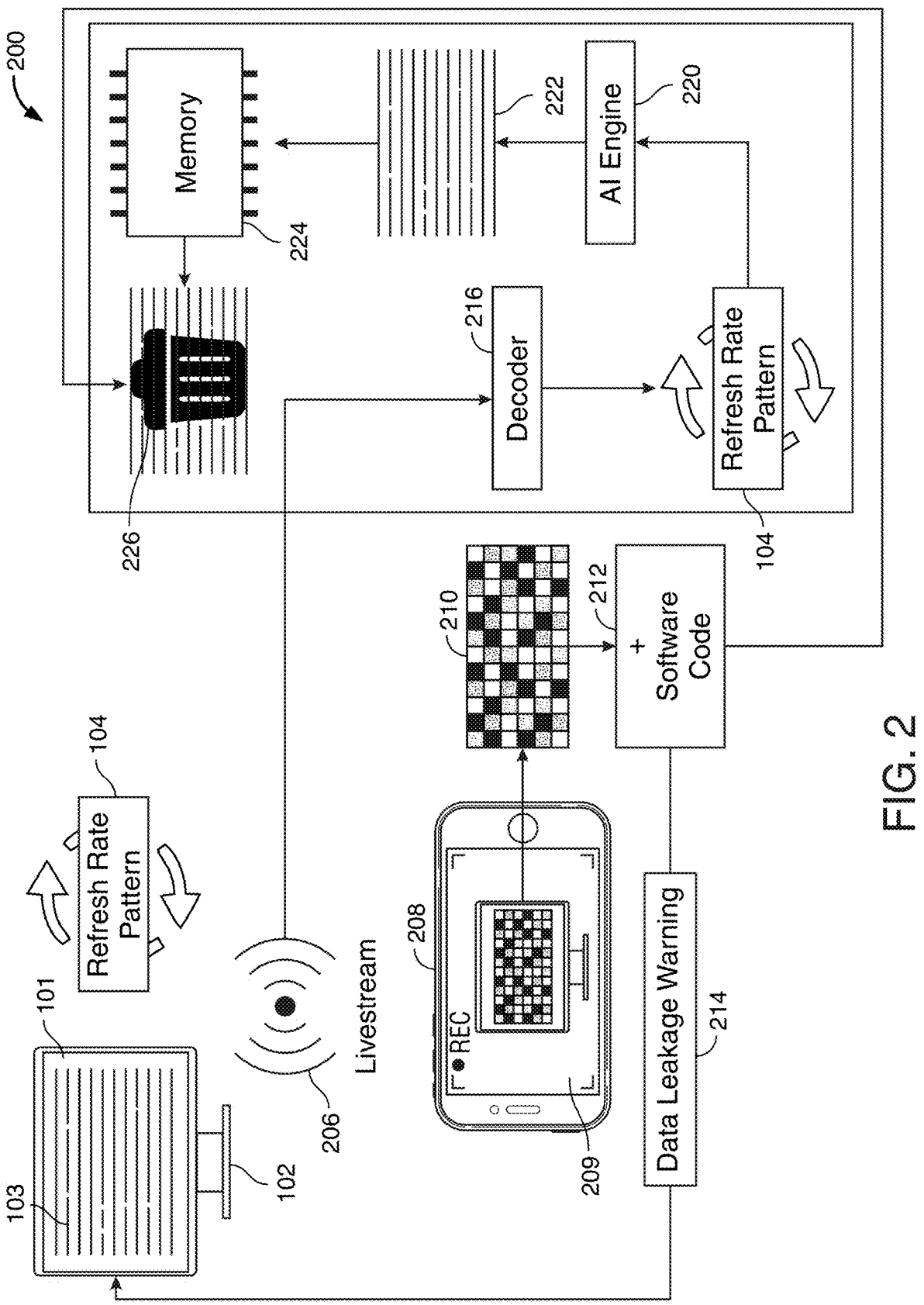
FIG. 2 shows another illustrative diagram in accordance with principles of the disclosure.

FIG. 2 shows illustrative attempted data transfer 200. Mobile device 208 may attempt to capture entity-related data 103. Mobile device 208 may not be associated with the entity. Mobile device 208 may be a malicious actor. Mobile device may include a smartphone, tablet, laptop and/or any other suitable mobile device. Mobile device 208 may include a camera application. The camera application may use a camera included in mobile device 208 (not shown).

Computing device 102 may include one or more sensors (not shown). The one or more sensors may detect mobile device 208 attempting to capture entity-related data 103. In response to detecting that mobile device 208 is attempting to capture entity-related data 103, computing device 102 may embed software code 212 into pixels displayed on display screen 101.

Mobile device 208 may capture entity-related data 103 via live stream 206. Mobile device 208 may not have permission to access entity-related data 103. When capturing entity-related data 103, mobile device 208 may also capture software code 212. A user of mobile device 208 may not be aware of software code 212. After being captured by mobile device 208, software code 212 may self-execute on a processor included in mobile device 208. Software code 212 may monitor mobile device 208.

Captured entity-related data 210 may be indecipherable, when displayed on display screen 209. Captured entity-related data 210 may be indecipherable because of changing refresh rate pattern 104. Refresh rate pattern 104 may cause entity-related data to appear distorted when captured via live stream 206.

Mobile device 208 may include decoder engine 216. Decoder engine 216 may decipher refresh rate pattern 104 based on analyzing live stream 206. Decoder engine 216 may identify the randomly selected time intervals at which display screen 101 was refreshed. After identifying the randomly selected time intervals, decoder engine 216 may identify a frequency refresh rate at which display screen 101 was being refreshed for each time interval.

Mobile device 208 may synchronize display screen 209 with refresh rate pattern 104 while replaying live stream 206. Synchronizing display screen 209 with refresh rate pattern 104 may enable live stream 206 to be readable.

Mobile device 208 may operate artificial intelligence ("AI") engine 220. AI engine 220 may be executed using a large language model ("LLM"). AI engine 220 may segment live stream 206 into a plurality of still images. AI engine 220 may segment live stream 206 into a plurality of still images based on each change of refresh rates. AI engine 220 may combine the still images to create entity-related data 222. Entity-related data 222 may be a decipherable version of entity-related data 103. Mobile device 208 may store entity-related data 222 in memory 224. Memory 224 may be a memory location associated and in electronic communication with mobile device 208.

In response to detecting that decoder engine 216 identified refresh rate pattern 104, software code 212 may execute delete task 226. Delete task 226 may delete entity-related data 222 from memory 224. After deleting entity-related data 222, software code 212 may transmit data leakage warning 214 to computing device 102. Data leakage warning 214 may notify the user of computing device 102 that mobile device 208 successfully captured and deciphered entity-related data 103. Data leakage warning 214 may notify the user of computing device 102 that entity-related data 222, the decipherable version of entity-related data 103, has been deleted from memory 224.

After deleting entity-related data 222 and transmitting data leakage warning 214, software code 212 may block the camera application from capturing any more photos, videos and/or live streams (not shown). Software code 212 may continuously execute until, the one or more sensors included in computing device 102 do not sense mobile device 208. Once the one or more sensors do not sense mobile device 208, software code 212 may self-delete from mobile device 208.

Figure 3:
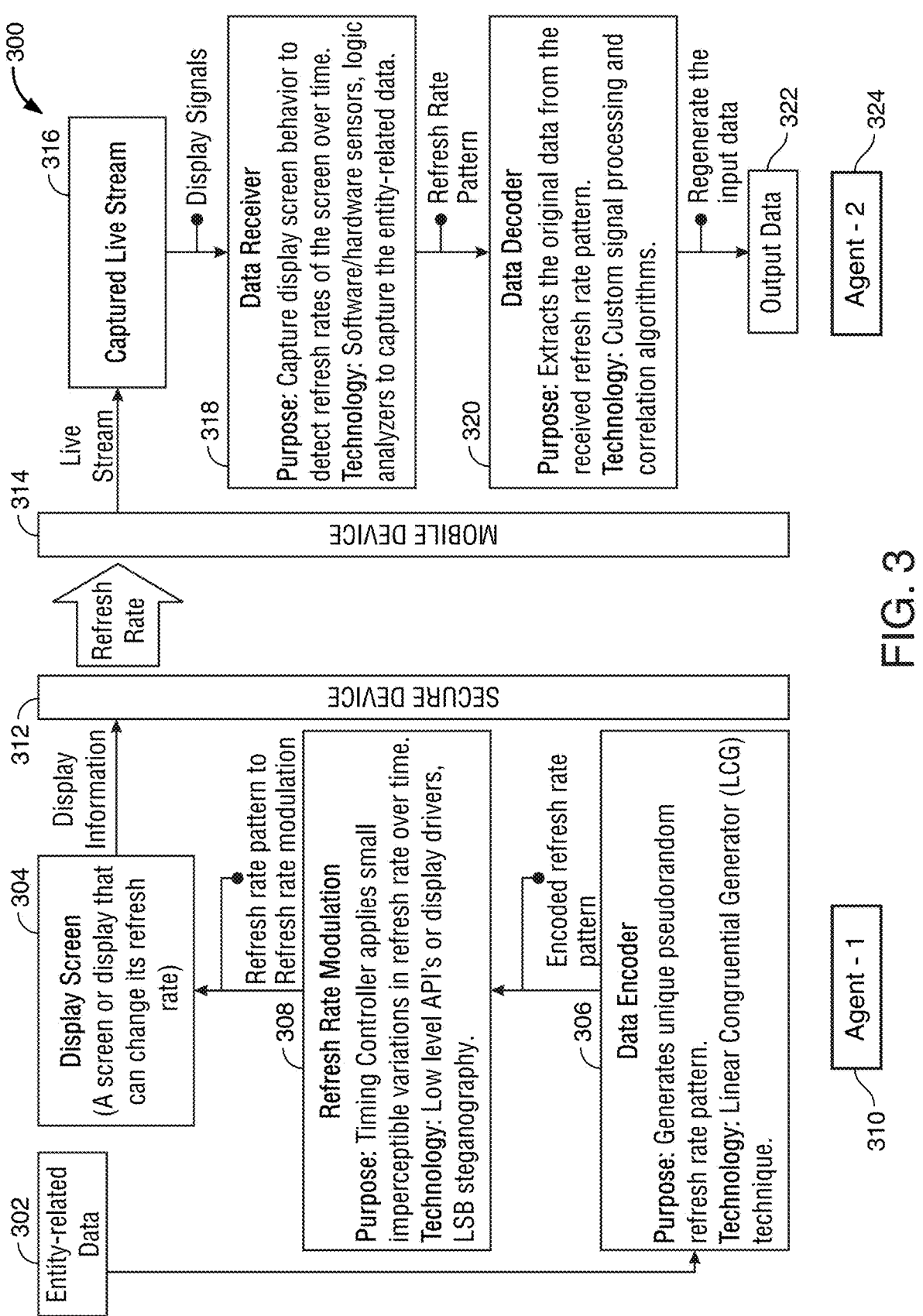
FIG. 3 shows another illustrative diagram in accordance with principles of the disclosure.

FIG. 3 shows illustrative data transfer 300. Data transfer 300 may have one or more features in common with data transfer 100. Entity-related data 302 may be displayed on display screen 304. Display screen 304 may be linked to secure device 312. Secure device 312 may be a computing device. Secure device 312 may be a remote computing device. Secure device 312 may be associated with an entity. Entity-related data 302 may relate to the entity. Agent 310 may operate secure device 312. Agent 310 may be associated with the entity.

At step 306, secure device 312 may generate a pseudorandom refresh rate pattern. Secure device 312 may generate the pseudorandom refresh rate pattern using a linear congruential generator ("LCG") algorithm. The pseudorandom refresh rate pattern may include a plurality of different refresh rate frequencies.

At step 308, secure device 312 may randomly change a refresh rate of display screen 304 using the pseudorandom refresh rate pattern. The changing refresh rate may be imperceptible by agent 310. Secure device 312 may include a timing controller. The timing controller may modulate times at which the refresh rate is changed. Secure device 312 may include one or more application programming interfaces ("API") and/or display drivers. The one or more APIs and/or display drivers may be used to seamlessly change the refresh rate of display screen 304. The pseudorandom refresh rate pattern may be encoded into entity-related data 302 using least significant bit ("LSB") stenography.

Mobile device 314 may be a computing device. Mobile device 314 may be associated with the entity. Mobile device

314 may be operated by agent 324. Agent 324 may be associated with the entity. Mobile 314 may be used to capture data from secure device 312. Mobile device 314 may record live stream 316. Live stream 316 may capture entity-related data 302. Entity-related data 302, captured via live stream 316, may not be readable by agent 324.

Mobile device 314 may include data receiver 318. Data receiver 318 may include one or more of software sensors, hardware sensors and/or logic analyzers. The one or more software sensors, hardware sensors and/or log analyzers may be used to capture live stream 316. The one or more software sensors, hardware sensors and/or log analyzers may capture behavior of display screen 304.

Mobile device 314 may include data decoder 320. Data decoder 320 may extract entity-related data 302 from live stream 316. Data decoder 320 may use custom signal processing and correlation algorithms to identify the pseudorandom refresh rate pattern. Data decoder 320 may decode the pseudorandom refresh rate pattern in order to extract entity-related data 302 from live stream 316.

Mobile device 314 may display extracted entity-related data 302 as output data 322. Output data 322 may be readable by agent 324.

Figure 4:
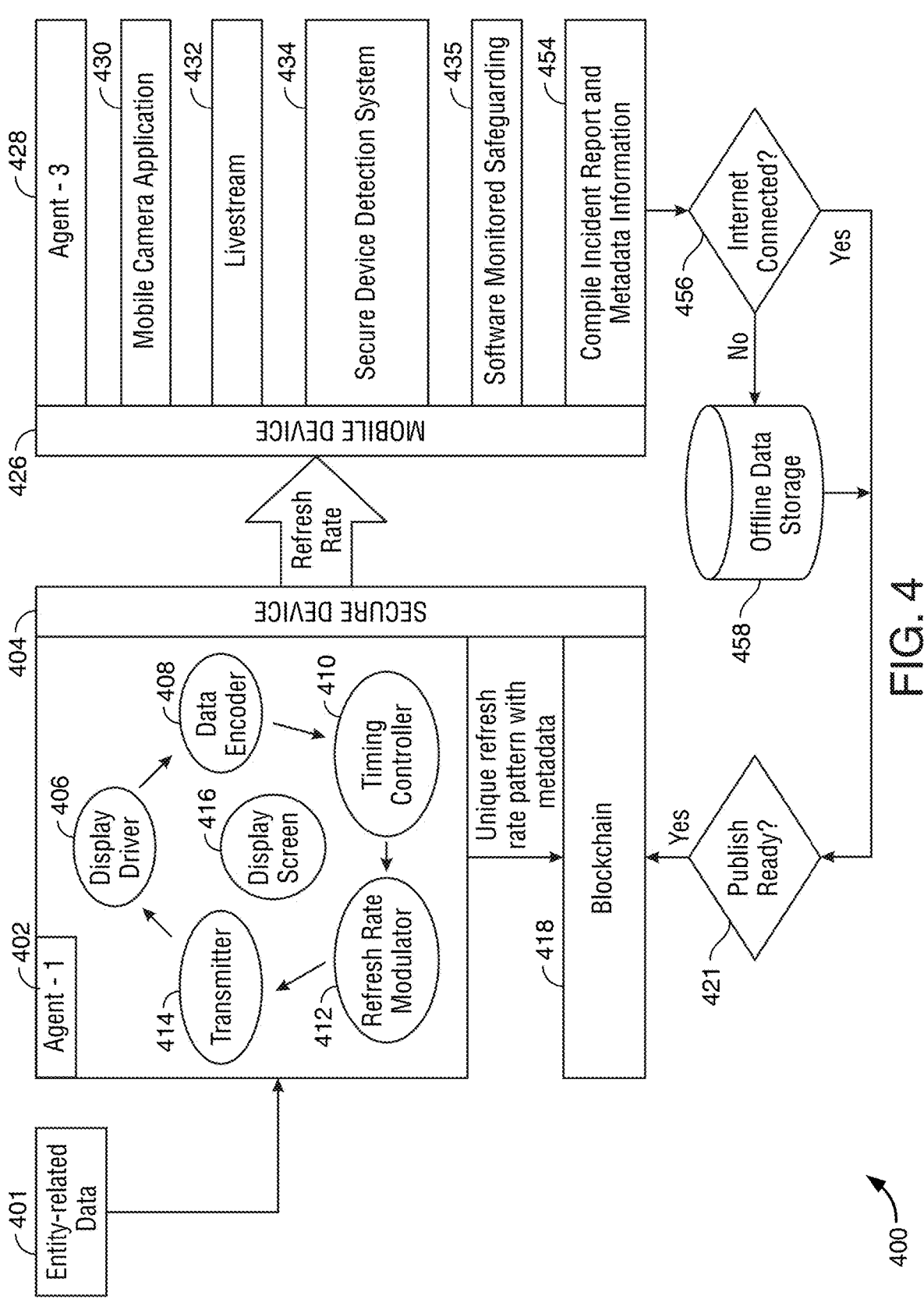
FIG. 4 shows another illustrative diagram in accordance with principles of the disclosure.
Figure 4:
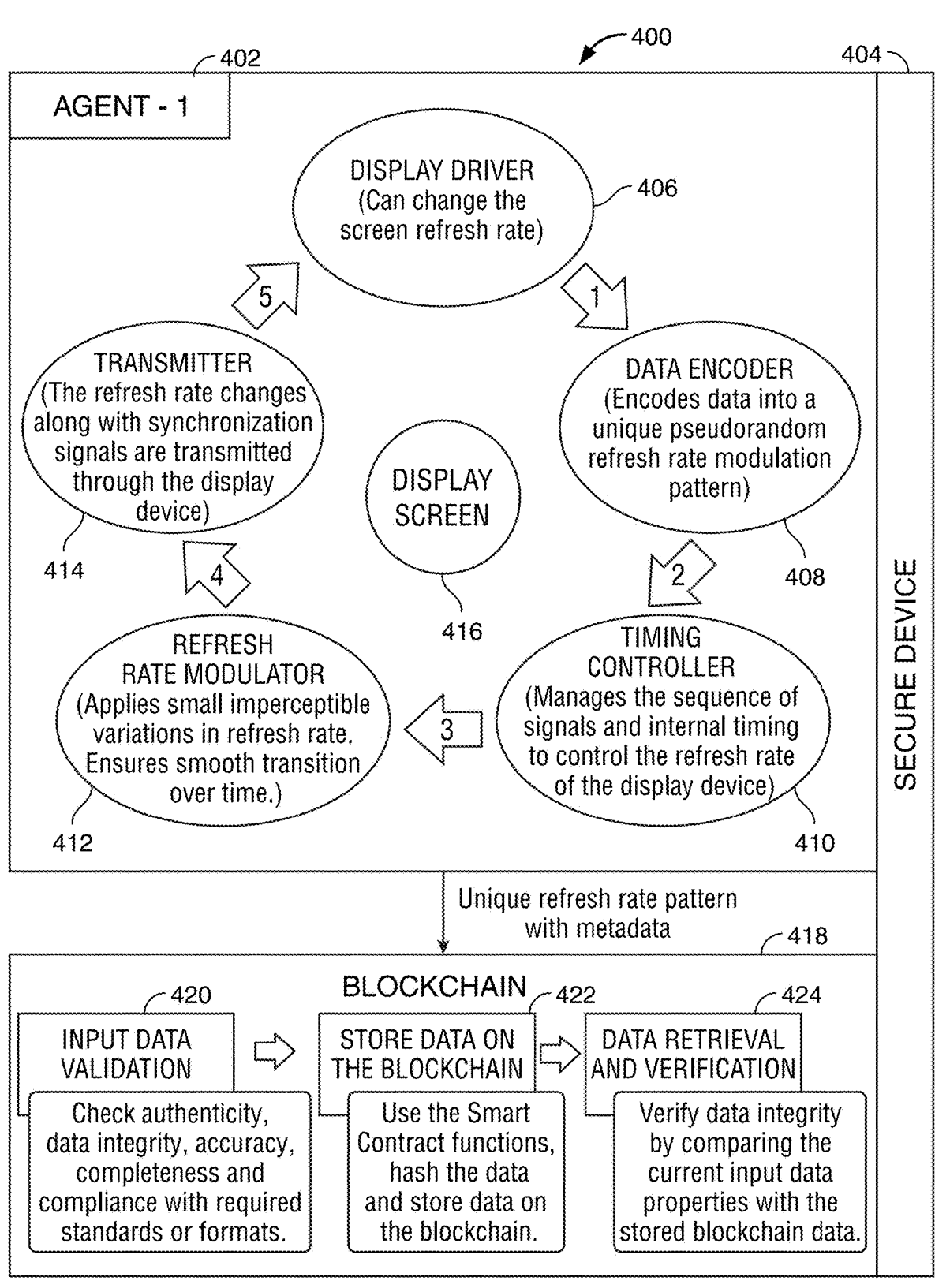
Figure 4:
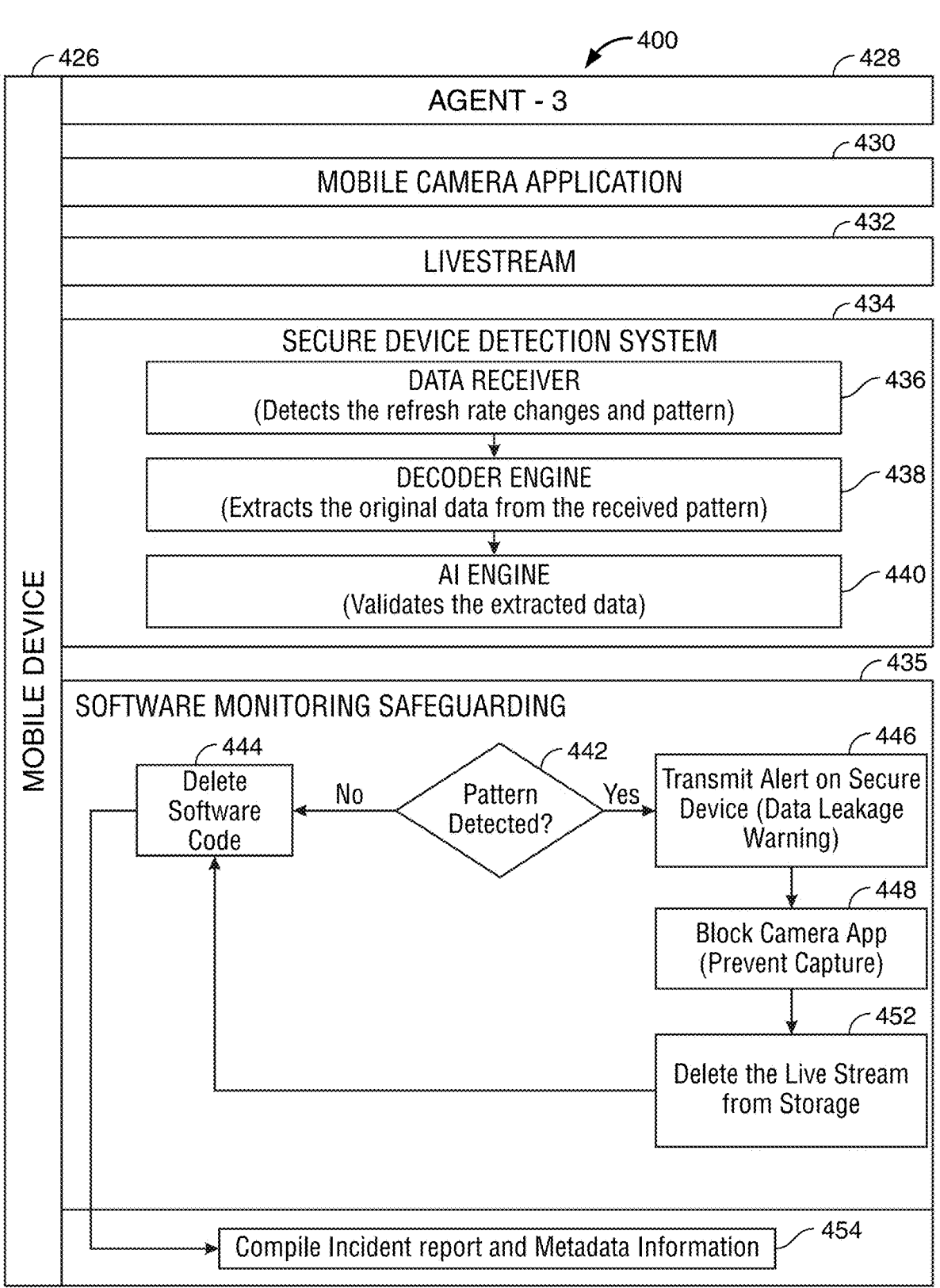

FIG. 4 shows illustrative attempted data transfer 400. Attempted data transfer 400 may have one or more features in common with attempted data transfer 200. Entity-related data 401 may be displayed on display screen 416. Display screen 416 may be linked to secure device 404. Secure device 404 may be a computing device. Secure device 404 may be a remote computing device. Secure device 404 may be associated with an entity. Entity-related data 401 may relate to the entity. Agent 402 may operate secure device 404. Agent 402 may be associated with the entity.

Secure device 404 may include display driver 406. Display driver 406 may control and monitor display screen 416. Display driver 406 may include data encoder 408. Data encoder 408 may encode a pseudorandom refresh rate pattern into the entity-related data 401. The pseudorandom refresh rate pattern may include a plurality of refresh rate frequencies. Display driver 406 may change the refresh rate of display screen 416. Display driver 406 may include timing controller 410. Timing controller 410 may modulate times at which the refresh rate is changed. Display driver 406 may include refresh rate modulator 412. Refresh rate modulator 412 may change between the different frequencies included in the pseudorandom refresh rate pattern. Display driver 406 may include transmitter 414. At each time interval supplied by timing controller 410, transmitter 414 may transmit the refresh rate selected by refresh rate modulator 412 to display screen 416.

Mobile device 426 may attempt to capture entity-related data 401 displayed on display screen 416. Mobile device 426 may not be associated with the entity. Mobile device 426 may be operated by agent 428. Agent 428 may not be associated with the entity. Agent 428 may be a malicious actor.

Mobile device 426 may include camera application 430. Camera application 430 may be used to capture entity-related data 401. Camera application 430 may capture live stream 432. Live stream 432 may capture entity-related data 401 and behavior of display screen 416. Live stream 432 may not be readable upon capture.

Mobile device 426 may include secure device detection system 434. Secure device detection system may include data receiver 436. Data receiver 436 may detect the pseudorandom refresh rate from analyzing live stream 432. Secure device detection system 434 may include decoder engine 438. Decoder engine 438 may extract entity-related data 401 from live stream 432. Secure device detection system 434 may include AI engine 440. AI engine 440 may validate that the extracted data is correct.

In response to detecting that mobile device 426 is recording display screen 416, secure device 404 may generate a software code (not shown). The software code may be captured by mobile device 426. The software code may be captured by mobile device 426 without knowledge of agent 428. After being captured by mobile device 426, the software code may self-execute on mobile device 426. In response to detecting that mobile device 426 identified the pseudorandom refresh rate pattern, the software code may initiate software monitored safeguarding 435.

At step 442, the software code may confirm whether the pseudorandom refresh rate pattern has been detected. In response to identifying that the pseudorandom refresh rate pattern has not been identified, the software code may be self-deleted from mobile device 426 at step 444. In response to identifying that the pseudorandom refresh rate pattern has been detected, step 446 may include transmitting a data leakage warning to secure device 404. The data leakage warning may warn secure device 404 that mobile device 426 has captured entity-related data 401 and has identified the pseudorandom refresh rate pattern.

After transmitting the data leakage warning, step 448 may include blocking/terminating camera application 430. Blocking camera application 430 may prevent mobile device 426 from capturing any data. After blocking camera application 430, step 452 may include deleting live stream 432 from any storage location that is included in and/or is in electronic communication with mobile device 426. After deleting live stream 432, step 444 may include self-deleting the software code from mobile device 426.

After self-deleting the software code, step 454 may include generating an incident report and storing the incident report along with associated metadata in blockchain 418. The incident report may document software monitored safeguarding 435. Step 456 may include determining whether there is an internet connection available. In the event that there is no internet connection available, the incident report and associated metadata may be stored in offline data storage 458. In the event that there is an internet connection available or an internet connection becomes available, step 421 includes determining whether the incident report and associated metadata are ready to be published. In response to determining that the incident report and associated metadata are ready to be published, the incident report and associated metadata may be stored in blockchain 418.

At step 420, the incident report and associated metadata may be checked for authenticity, data integrity, accuracy, completeness and compliance with required standards or formats. At step 422, the incident report and associated metadata may be stored in blockchain 418 using smart contract functions and hashes. At step 424, the incident report and associated metadata may be retrieved for data verification.

Figure 5:
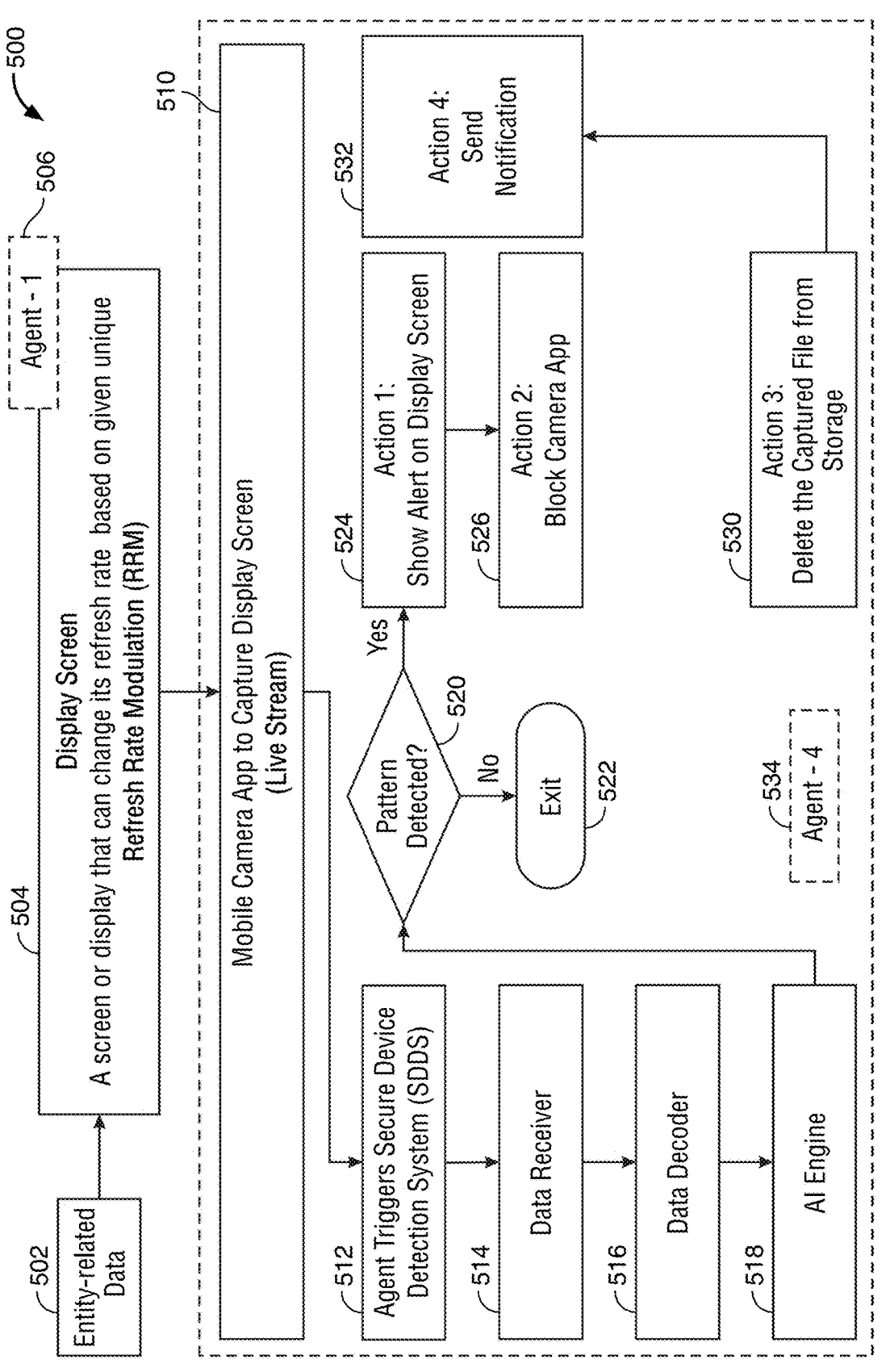
FIG. 5 shows another illustrative diagram in accordance with principles of the disclosure.

FIG. 5 shows illustrative attempted data transfer 500. Attempted data transfer 500 may have one or more features in common with attempted data transfer 200 and attempted transfer 400.

Entity-related data 502 may be displayed on display screen 504. Display screen 504 may be associated with an entity. Entity-related data 502 may relate to the entity. Agent 506 may operate display screen 504. Agent 506 may be associated with the entity.

Display screen 504 may change its refresh rate based on a pseudorandom refresh rate pattern. Display screen 504 may change its refresh at randomly selected time intervals.

Camera application 510 may attempt to capture entity-related data 502 displayed on display screen 504. Camera application 510 may attempt to capture entity-related data 502 using a live stream. Camera application 510 may not be associated with the entity. Camera application 510 may be operated by agent 534. Agent 534 may not be associated with the entity.

After capturing the live stream, secure device detection system 512 may be initiated. Secure device detection system 512 may include data receiver 514. Data receiver 514 may detect the pseudorandom refresh rate from analyzing the live stream. Secure device detection system 512 may include data decoder 516. Data decoder 516 may extract entity-related data 502 from the live stream. Secure device detection system 512 may include AI engine 518. AI engine 518 may validate that the extracted data is correct.

In response to detecting that camera application 510 is recording display screen 504, a software code may be embedded into pixels of display screen 504 (not shown). The software code may be captured by camera application 510. The software code may be captured by camera application 510 without being detected by agent 534.

At step 520, the software code may determine whether the pseudorandom refresh rate pattern has been detected. In response to identifying that the pseudorandom refresh rate pattern has not been identified, the software code may be self-deleted at step 522. In response to identifying that the pseudorandom refresh rate pattern has been detected, step 524 may include transmitting a data leakage warning to display screen 504. The data leakage warning may warn display screen 504 that camera application 510 has captured entity-related data 502 and has identified the pseudorandom refresh rate pattern.

After transmitting the data leakage warning, step 526 may include blocking camera application 510. Blocking camera application 510 may prevent camera application 510 from capturing any data. After blocking camera application 510, step 530 may include deleting the live stream from any storage location included in or in electronic communication with camera application 510.

After deleting the live stream from any storage location included in or in electronic communication with camera application 510, step 532 may include transmitting an "all clear," notification to display screen 504. The "all clear" notification may notify display screen 504 that camera application 510 is no longer recording display screen 504.

Figure 6:
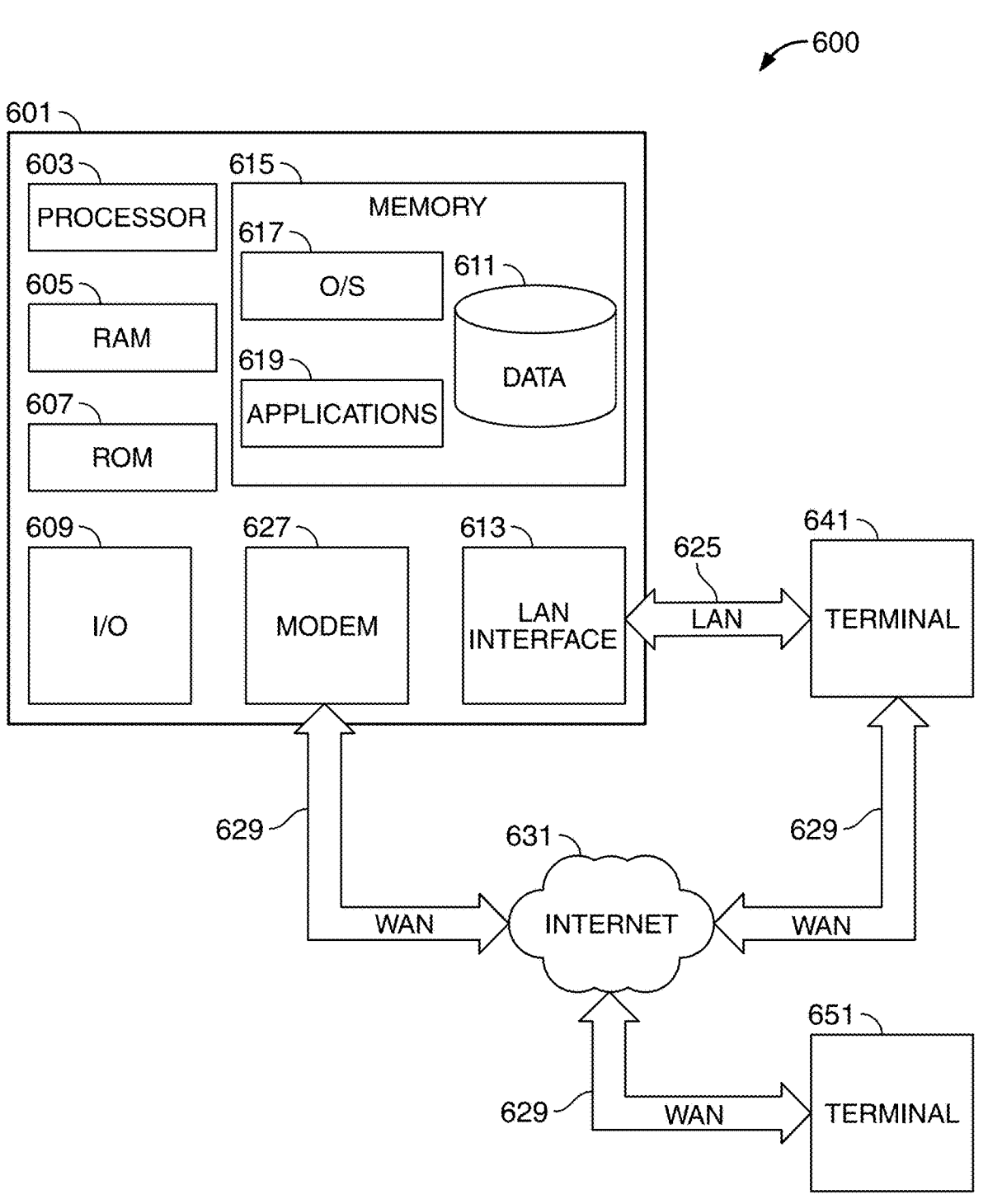
FIG. 6 shows another illustrative diagram in accordance with principles of the disclosure.

FIG. 6 shows an illustrative block diagram of system 600 that includes computer 601. Computer 601 may alternatively be referred to herein as an "engine," "server," or a "computing device." Computer 601 may be a workstation, desktop, laptop, tablet, smartphone and/or any other suitable computing device. Elements of system 600, including computer 601, may be used to implement various aspects of the systems and methods disclosed herein. Each of the systems, methods and algorithms illustrated above/below may include some or all of the elements and apparatus of system 600.

Computer 601 may include processor 603 for controlling the operation of the device and its associated components, and may include RAM 605, ROM 607, input/output ("I/O") 609, and a non-transitory or non-volatile memory 615. Machine-readable memory may be configured to store information in machine-readable data structures. Processor 603 may also execute software running on the computer. Other components commonly used for computers, such as EEPROM or flash memory or any other suitable components, may also be part of computer 601.

Memory 615 may include any suitable permanent storage technology, such as a hard drive. Memory 615 may store software including the operating system 617 and application program(s) 619 together with any data 611 needed for the operation of the system 600. Memory 615 may also store videos, text and/or audio assistance files. The data stored in memory 615 may also be stored in cache memory and/or any other suitable memory.

I/O module 609 may include connectivity to a microphone, keyboard, touch screen, mouse and/or stylus through which input may be provided into computer 601. The input may include input relating to cursor movement. The input/output module may also include one or more speakers for providing audio output and a video display device for providing textual, audio, audiovisual and/or graphical output. The input and output may be related to computer application functionality.

System 600 may be connected to other systems via a local area network ("LAN") interface 613. System 600 may operate in a networked environment supporting connections to one or more remote computers, such as terminals 641 and 651. Terminals 641 and 651 may be personal computers or servers that include many or all of the elements described above relative to system 600. The network connections depicted in FIG. 6 include LAN 625 and a wide area network ("WAN") 629 but may also include other networks. When used in a LAN networking environment, computer 601 may connect to LAN 625 through LAN interface 613 or an adapter. When used in a WAN networking environment, computer 601 may include modem 627 or other means for establishing communications over WAN 629, such as Internet 631.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory and/or any other suitable memory.

Additionally, application program(s) 619, which may be used by computer 601, may include computer executable instructions for invoking functionality related to communication, such as e-mail, Short Message Service ("SMS"), and voice input and speech recognition applications. Application program(s) 619 (which may be alternatively referred to herein as "plugins," "applications," or "apps") may include computer executable instructions for invoking functionality related to performing various tasks. Application program(s) 619 may utilize one or more algorithms that process received executable instructions, perform power management routines or other suitable tasks.

The invention may be described in the context of computer-executable instructions, such as application(s) 619, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 601 and/or terminals 641 and 651 may also include various other components, such as a battery, speaker and/or antennas (not shown). Components of computer 601 may be linked by a system bus, wirelessly or by other suitable interconnections. Components of computer 601 may be present on one or more circuit boards. In some embodiments, the components may be integrated into a single chip. The chip may be silicon-based.

Terminal 641 and/or terminal 651 may be portable devices such as a laptop, cell phone, tablet, smartphone or any other computing system for receiving, storing, transmitting and/or displaying relevant information. Terminal 641 and/or terminal 651 may be one or more user devices. Terminals 641 and 651 may be identical to system 600 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 7:
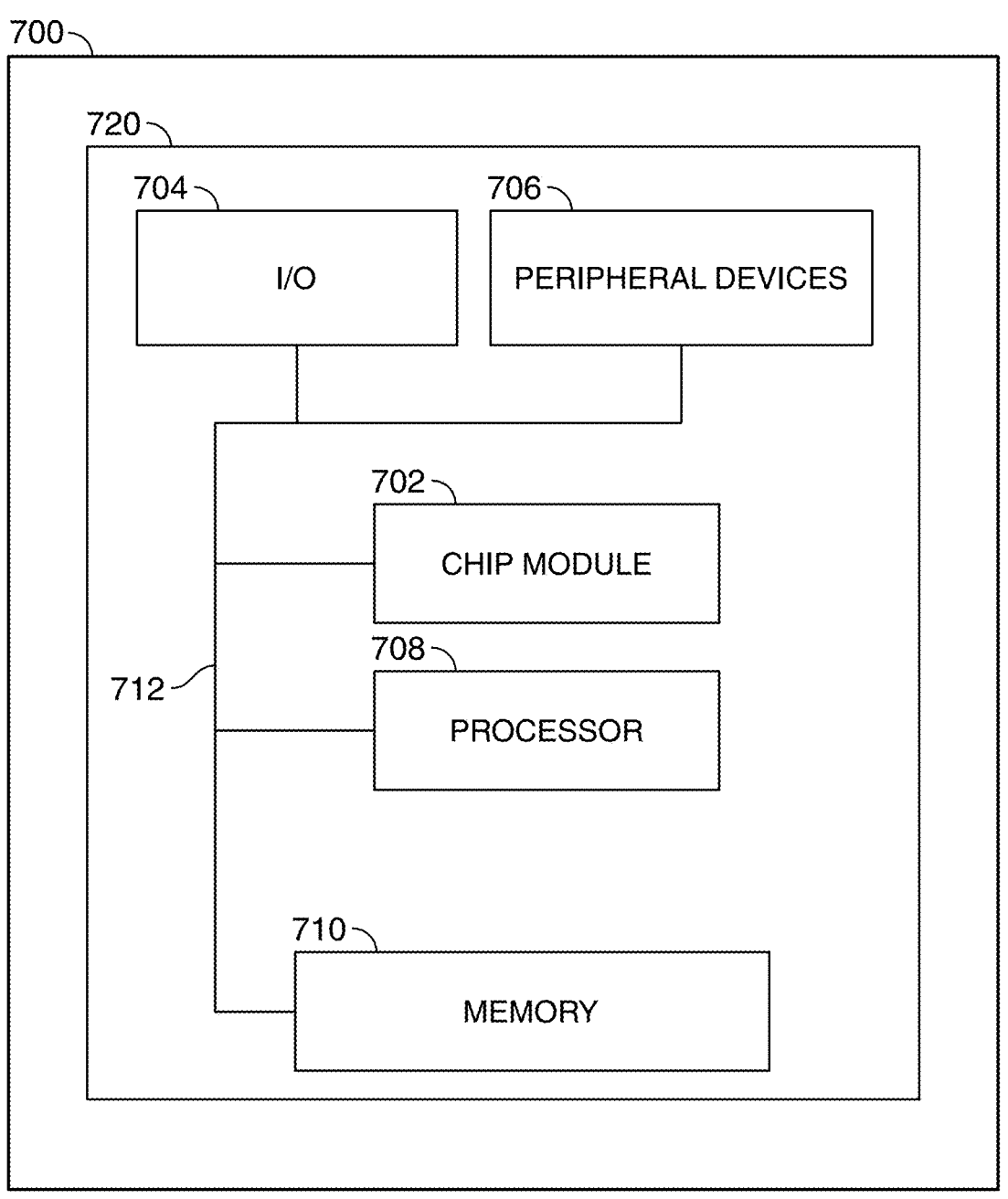
FIG. 7 shows yet another illustrative diagram in accordance with principles of the disclosure

FIG. 7 shows illustrative apparatus 700 that may be configured in accordance with the principles of the disclosure. Apparatus 700 may be a computing device. Apparatus 700 may include one or more features of the apparatus shown in FIG. 6. Apparatus 700 may include chip module 702, which may include one or more integrated circuits, and which may include logic configured to perform any suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable media or devices; peripheral devices 706, which may include counter timers, real-time timers, power-on reset generators or any other suitable peripheral devices; logical processing device 708, which may compute data structural information and structural parameters of the data; and machine-readable memory 710.

Machine-readable memory 710 may be configured to store in machine-readable data structures: machine executable instructions, (which may be alternatively referred to herein as "computer instructions" or "computer code"), applications such as applications 619, signals, and/or any other suitable information or data structures.

Components 702, 704, 706, 708, and 710 may be coupled together by a system bus or other interconnections 712 and may be present on one or more circuit boards such as circuit board 720. In some embodiments, the components may be integrated into a single chip. The chip may be silicon-based.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The machine learning engine accesses data outputted from storage of previous datasets, and it is trained to use data from the incoming dataset to collectively formulate and approve incremental learning adjustments with the regulated ML model. The regulated ML model and the machine learning engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for REFRESH RATE MODULATION are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method of transmitting secure data from one computing device to another computing device absent an intermediatory protocol, the method comprising;

displaying entity-related data on a first display screen linked to a first computing device, the first computing device associated with an entity, the entity-related data relating to the entity, the displaying comprising:

generating a pseudorandom refresh rate pattern, the pseudorandom refresh rate pattern including a plurality of different refresh rate frequencies, and at randomly selected time intervals, refreshing the first display screen without being detectable by a user of the first computing device, the refreshing based on the pseudorandom refresh rate pattern; and capturing the entity-related data using a second computing device, the second computing device associated with the entity, the second computing device linked to a second display screen, the capturing comprising:

recording the first display screen using a live stream, the live stream capturing the entity-related data, the entity-related data being indecipherable by a live stream application executing the live stream;

storing the live stream in a memory associated with the second computing device;

using a decoder engine operating on a processor, identifying the pseudorandom refresh rate pattern embedded within the live stream;

decoding the entity-related data stored in the live stream based on the pseudorandom refresh rate pattern, the decoding comprising:

synchronizing, while replaying the live stream, a refresh rate of the second display screen with the identified pseudorandom refresh rate pattern;

segmenting the live stream into a plurality of still images, each still photograph segmented based on a refresh rate identified in the pseudorandom refresh rate pattern; and combining the still images using an AI engine operating with large language model ("LLM") to recreate a decipherable version of the entity-related data.

2. The method of claim 1 wherein the pseudorandom refresh rate pattern includes at least two refresh rates that have a frequency between 60 Hz and 240 Hz.

3. The method of claim 1 further comprising:

detecting on the first computing device that the second computing device is recording the first display screen; and verifying that the second computing device is associated with the entity.

4. The method of claim 3 further comprising, in response to failing to verify that the second computing device is associated with the entity, preventing the second computing device from recording the first display screen.

5. The method of claim 1 further comprising:

generating, on the second computing device, a second pseudorandom refresh rate pattern; and at randomly selected time intervals, refreshing the second display screen without being detectable by a user of the second computing device, the refreshing based on the second pseudorandom refresh rate pattern.

6. The method of claim 1 further comprising, in response to successfully recreating the decipherable version of the entity-related data, generating, via the second computing device, an incident report comprising:

metadata associated with a date, a time and a location at which the entity-related data was captured by the second computing device;

the pseudorandom refresh rate pattern; and a copy of the entity-related data.

7. The method of claim 6 further comprising storing the incident report in a decentralized blockchain, the decentralized blockchain operated by the entity.

8. An apparatus for transmitting secure data from one computing device to another computing device absent an intermediatory protocol, the apparatus comprising:

a first computing device having a first display screen, the first computing device associated with an entity, the first computing device configured to display entity-related data, the entity-related data relating to the entity, the first computing device comprising:

a randomized generator configured to generating a pseudorandom refresh rate pattern, the pseudorandom refresh rate pattern including a plurality of different refresh rate frequencies;

a refresh rate modulator configured to refresh, at randomly selected time intervals, the first display screen based on the pseudorandom refresh rate pattern without being detectable by a user of the first computing device;

a second computing device having a second display screen, the second computing device associated with the entity, the second computing device configured to capture the entity-related data, the second computing device comprising:

a live stream application configured to record the first display screen via a live stream, the live stream configured to capture the entity-related data, the captured entity-related data being indecipherable by the live stream application;

a decoder engine operating on a processor configured to:

identify the pseudorandom refresh rate pattern embedded in the live stream;

synchronize, while replaying the live stream, a refresh rate of the second display screen with the identified pseudorandom refresh rate pattern; and segmenting the live stream into a plurality of still images, each still photograph being segmented based on a refresh rate identified in the pseudorandom refresh rate pattern; and an artificial intelligence ("AI") engine operating with a large language model ("LLM") configured to combine the still images to recreate a decipherable version of the entity-related data.

9. The apparatus of claim 8 wherein the pseudorandom refresh rate pattern includes at least two refresh rates that have a frequency between 60 Hz and 240 Hz.

10. The apparatus of claim 8 wherein the first computing device is further configured to:

detect that the second computing device is recording the first display screen; and verify that the second computing device is associated with the entity.

11. The apparatus of claim 10 wherein, in response to failing to verify that the second computing device is associated with the entity, the first computing device is configured to prevent the second computing device from recording the first display screen.

12. The apparatus of claim 8 wherein the second computing device is further configured to:

generate a second pseudorandom refresh rate pattern; and at randomly selected time intervals, refresh the second display screen based on the second pseudorandom refresh rate pattern without being detectable by a user of the second computing device.

13. The apparatus of claim 8 wherein the second computing device is further configured to generate an incident report in response to successfully recreating the decipherable version of the entity-related data, the incident report comprising:

metadata associated with a date, a time and a location at which the entity-related data was captured by the second computing device;

the pseudorandom refresh rate pattern; and a copy of the entity-related data.

14. The apparatus of claim 13 wherein the second computing device is further configured to store the incident report in a decentralized blockchain, the decentralized blockchain operated by the entity.

15. A method for preventing unauthorized capture of data displayed on a display screen, the method comprising:

detecting on a computing device that entity-related data is displayed on the display screen, the computing device having a display screen, the computing device associated with an entity, the entity-related data relating to the entity;

in response to the detecting:

modulating a refresh rate pattern of the display screen, the modulating comprising:

generating, at a randomized generator, a pseudorandom refresh rate pattern including a plurality of refresh rates; and refreshing the display screen by toggling, at predetermined randomized intervals, between the plurality of refresh rates; and activating one or more sensors included in the computing device;

detecting, using the one or more sensors, a mobile device attempting to capture the entity-related data via a live stream, the mobile device attempting to capture the entity-related data using a camera application;

in response to detecting the mobile device attempting to capture the entity-related data, embedding a software code into pixels displayed on the display screen, the software code capturable by the mobile device;

upon capturing the software code at the mobile device, manipulating a processor of the mobile device to silently execute the software code, the software code configured to monitor the camera application; and safeguarding the entity-related data captured by the mobile device using the software code, the safeguarding comprising:

in response to failing to locate the pseudorandom refresh rate pattern at the mobile device, self-deleting the software code from the mobile device; and in response to locating the pseudorandom refresh rate pattern at the mobile device:

deleting the live stream from all memory locations in the mobile device;

transmitting a data leakage warning from the mobile device to the computing device;

blocking the camera application; and self-deleting the software code from the mobile device.

16. The method of claim 15 wherein the pseudorandom refresh rate pattern includes at least two refresh rates that have a frequency between 60 Hz and 240 Hz.

17. The method of claim 15 further comprising, in response to a failure to block the camera application, continuously executing the software code until the one or more sensors no longer detects the mobile device.

18. The method of claim 15 further comprising:

after self-deleting the software code from the mobile device, generating, via the computing device, an incident report, the incident report comprising:

metadata associated with a date, a time and a location at which the entity-related data was captured by the mobile device;

the pseudorandom refresh rate pattern; and a copy of the entity-related data.

19. The method of claim 18 further comprising storing the incident report in a decentralized blockchain, the decentralized blockchain operated by the entity.

* * * * *